V. G. APPLE.
INSTRUMENT SET FOR ELECTRICAL DISTRIBUTION SYSTEMS.
APPLICATION FILED MAY 11, 1907.

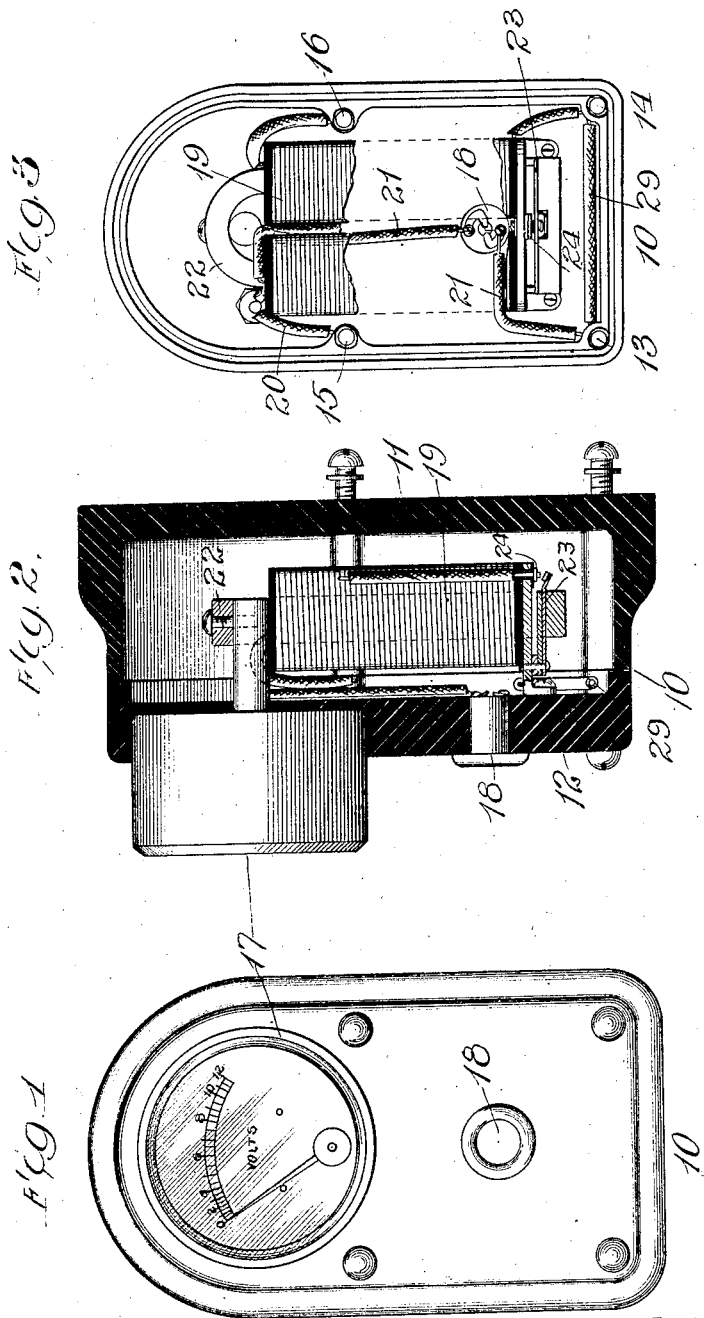

1,021,293.

Patented Mar. 26, 1912.

2 SHEETS—SHEET 2.

Witnesses:
Harry R. Little
Ray White

Inventor:
Vincent G. Apple.
By Forée Bain and May
Attys.

UNITED STATES PATENT OFFICE.

VINCENT G. APPLE, OF DAYTON, OHIO, ASSIGNOR TO DAYTON ELECTRICAL MANUFACTURING CO., A CORPORATION OF OHIO.

INSTRUMENT SET FOR ELECTRICAL DISTRIBUTION SYSTEMS.

1,021,293.  Specification of Letters Patent.  Patented Mar. 26, 1912.

Application filed May 11, 1907. Serial No. 373,056.

*To all whom it may concern:*

Be it known that I, VINCENT G. APPLE, a citizen of the United States, residing at Dayton, in the county of Montgomery and State of Ohio, have invented certain new and useful Improvements in Instrument Sets for Electrical Distribution Systems, of which the following is a specification.

My invention relates to instrument sets for electric distribution systems, and more particularly for electric ignition systems for gas engines.

My present invention has for its object to provide a new and useful instrument set embodying suitable instruments and circuit connections, so that when properly connected with an external working circuit, the dynamo, and battery, the system so equipped is provided with means for measuring the voltage of the battery, operable at pleasure through a switch connection, and means for controlling the connections of the dynamo and battery, such that connection will be established between the dynamo and the battery only when the potential of the dynamo is higher than that of the battery.

Figure 4:
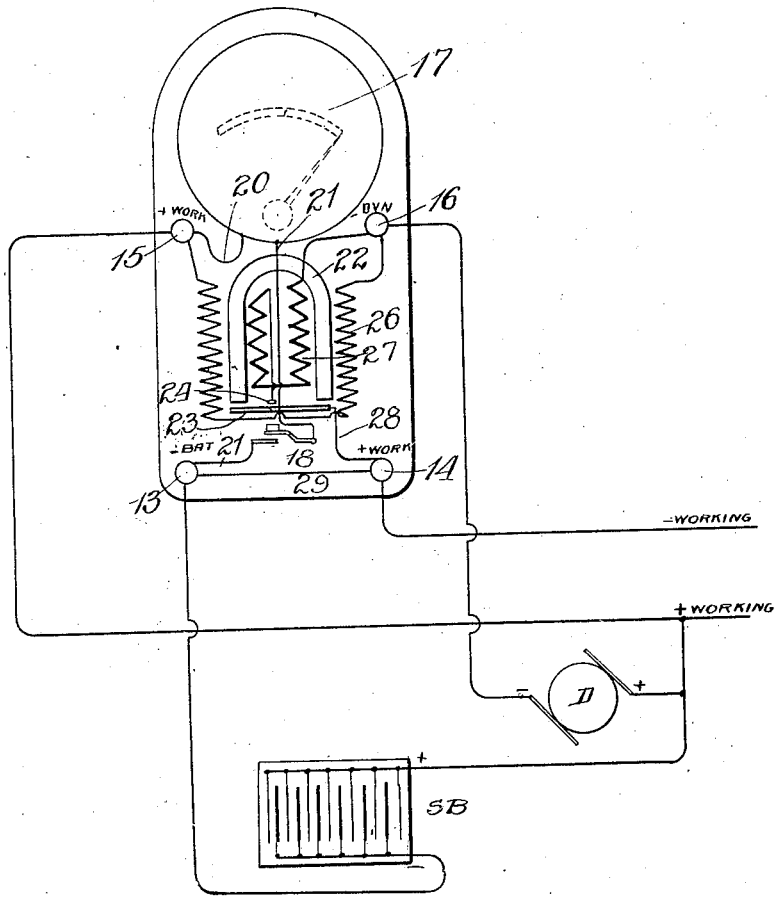
Figure 5:
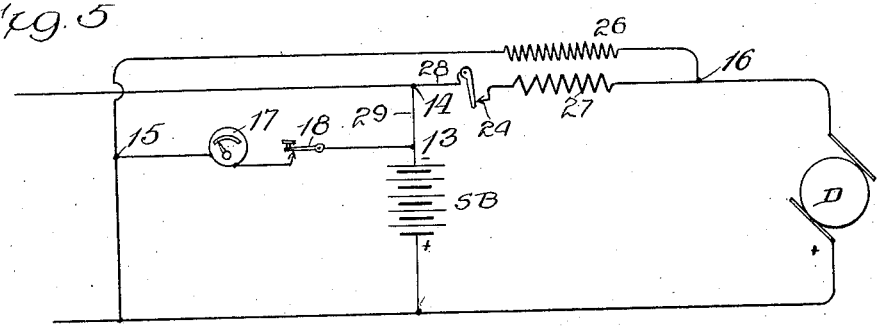

In the drawings, wherein I have indicated an instrument set embodying my invention and suitable exterior electrical connections therefor, Figure 1 is a front elevation of the set. Fig. 2 is a central vertical section therethrough, and Fig. 3 is a rear elevation of the set with the casing removed; Fig. 4 indicates diagrammatically the electrical connections of the instrument set and exterior wiring devices, and Fig. 5 is a simplified diagram of like connections.

Throughout the drawings like numerals of reference refer always to like parts.

In the drawings 10 indicates a frame, preferably consisting of interfitting insulating members, arranged to form a hollow casing, 11 being a hollow base member and 12 an interfitting cover member. Upon the top member of the casing are provided suitable terminal members 13, 14, 15 and 16, which may conveniently be metallic sleeves arranged to receive screws, extending to the rear exterior of the casing for connection with the external circuit wiring. The cover member 12 of the casing carries a suitable volt-meter 17, a hand switch 18, and an automatic cut out 19. The volt-meter dial is exposed as shown. The switch 18 is preferably a push button exposed for operation from the exterior of the cover and controlling the circuit of the volt-meter, so that by the operation of the switch the volt-meter may be cut into connection with the terminals of an exterior battery circuit. The cut-out 19 is concealed within the casing and provided with electrical connections such that, when associated with the exterior circuit wiring, it automatically controls communication between the battery and the dynamo.

In the specific construction shown 13 is the terminal for the negative side of the storage battery S B, the terminal 14 is connected with the negative side of a working circuit, contact 15 is connected to the plus side of the working circuit, to which is also connected the positive terminals of the dynamo D and the storage battery S B, and the terminal 16 is connected to the negative terminal of the dynamo. Internally the volt-meter 17 is connected as by wire 20 to the terminal 15, connected with the positive terminal of the storage battery. The opposite terminal of the volt-meter 17 is connected by wire 21 to one terminal of the push-button switch 18, the other terminal being connected by a continuation of wire 21 with the terminal 13 of the set for connection with the negative terminal of the storage battery.

The automatic cut-out for the storage battery, indicated generally at 19, comprises an electro-magnet 22 provided with an armature 23 having a front contact 24, the magnet being provided with two windings, one a high resistance winding 26, connected between posts 15 and 16, and a low resistance coil 27, connected between posts 16 and the contact 24 of the cut-out, the armature 23 thereof being connected by wire 28 to the terminal 14, which said terminal is directly connected as by wire 29 with the terminal 13. Now it will be seen that under normal conditions the dynamo D has a constant circuit through the high resistance coil 26 from the terminal 15 of the set connected to the positive pole of the dynamo, to the terminal 16 thereof connected with the negative side of the dynamo. When the electro-motive force of the dynamo is sufficiently high the armature is attracted by the high resistance coil and closes a circuit from the dynamo to the positive pole of the storage battery connection, and from the terminal 13 of the set, connected to the negative side of the battery through wires 29 and 28, the armature 23 and its contacts 24, the low resistance coils 27 to the terminal 16 connected with the negative terminal of the dynamo. Should at any time the electro-motive force of the dynamo drop below that of the battery, however, the reversal of current flow through the circuit last described, causes the effective deënergization of magnet 22, so that the armature 23 drops back opening the circuit of the low resistance winding and effecting disconnection of the dynamo and battery. At all times, it will be seen, that the battery is bridged across the working circuit, and at any time its voltage may be read by closing the hand switch 18, which bridges the voltmeter across the battery terminals. It will be observed that this ability to read at any time the battery voltage is of great advantage, particularly in electrical ignition work, where usually the dynamo is driven through an adjustable governor, whereby its speed may be regulated, in relation to the speed of the prime mover, such as the fly-wheel of the gas engine with which the ignition system is connected. Under such circumstances the slowing down of an engine and consequent slowing down of the dynamo may result in the reduction of the dynamo voltage to a point below the voltage of the battery, so that although by the operation of the automatic cut-out the reversal of current flow through the dynamo is avoided, the battery alone is called upon to supply the ignition current and undergoes constant depletion, so that observation through the agency of the volt-meter and the slight drop in the storage battery voltage indicates to the observer that the dynamo should be speeded up, by suitable adjustment of its governor. In this manner the instrument set, which I have described, supplies a means for protecting the dynamo against discharge from the battery, when the dynamo voltage drops, and also for protecting the battery against being run down needlessly, or against being charged at too rapid a rate.

While I have herein described in some detail an operative embodiment of my invention, which I have commercially successfully employed, it will be apparent that changes may be made in the specific construction without departure from the spirit of my invention within the scope of the appended claims.

Having thus described my invention, what I claim and desire to secure by Letters Patent of the United States, is:

1. An instrument set of the character described, comprising a hollow frame, suitable terminals exposed upon the rear face of the frame, a voltmeter and a hand switch exposed upon the front face of the frame, a cut out relay completely inclosed within the frame, and connections for bringing the voltmeter through the hand switch across certain of said terminals, and permanently connecting the automatic cut out relay with certain of said terminals.

2. An instrument set of the character described, comprising a frame, including separable base and cover parts inclosing a chamber, suitable terminal connections from the interior to the exterior of the frame, a voltmeter and a hand switch exposed upon the face of the cover, an automatic cut out relay inclosed within the chamber of the frame, and wiring connections concealed within the chamber, connecting the voltmeter and hand switch in series with appropriate terminals, and permanently connecting the cut out relay with appropriate terminals.

3. An instrument set for inclusion in an ignition system, consisting of a frame, providing a separable base and cover including a chamber, a volt-meter, an automatic cut-out and a hand-switch carried by said cover, and suitable circuit connections, the automatic cut-out and wiring connections being concealed within the chamber by the cover, said connections comprising a terminal for connection in common with a dynamo, a storage battery and a working circuit, and individual connections for the remaining terminals of said dynamo, storage battery and working circuit, and the electrical connections comprising wiring for bridging the volt-meter through the hand switch across the battery terminals, and for connecting the automatic cut-out to control the connection of the individual battery terminal with the individual dynamo terminal.

4. An instrument set for inclusion in an ignition system comprising a frame providing a separable base and cover of insulating material inclosing a chamber, said frame carrying exposed upon the face of its cover a voltmeter and a hand-switch, and carrying on the cover within the chamber, an automatic cut out, four binding posts on the outside of the frame for mechanically connecting the frame to a support and for electrically connecting one in common to a dynamo, storage battery, and working circuit, and the others individually to the said electrical instrumentalities, and connectors concealed within the frame for bridging the voltmeter through the hand-switch across the battery terminals and for connecting the automatic cut out to control the connection of the individual battery terminal with the individual dynamo terminal.

In testimony whereof I hereunto set my hand in the presence of two witnesses.

VINCENT G. APPLE.

In the presence of—
 E. M. GRIER,
 N. E. SNYDER.

---

Copies of this patent may be obtained for five cents each, by addressing the "Commissioner of Patents, Washington, D. C."